United States Patent [19]

Takarabe et al.

[11] Patent Number: 4,901,421
[45] Date of Patent: Feb. 20, 1990

[54] METHOD OF ASSEMBLING SEAT SLIDE DEVICE

[75] Inventors: Isamu Takarabe; Yutaka Miyame, both of Yokohama, Japan

[73] Assignee: Ohi Seisakusho Co., Ltd., Yokohama, Japan

[21] Appl. No.: 302,290

[22] Filed: Jan. 27, 1989

[30] Foreign Application Priority Data

Feb. 1, 1988 [JP] Japan .................................. 63-19489

[51] Int. Cl.⁴ ............................................ B23P 11/00
[52] U.S. Cl. ......................................... 29/437; 29/439; 384/34; 384/47; 384/48; 248/430; 403/80
[58] Field of Search ..................... 29/437, 439; 384/34, 384/47, 48; 248/429, 430; 297/341; 403/80; 296/65.1

[56] References Cited

U.S. PATENT DOCUMENTS

| | | | |
|---|---|---|---|
| 2,299,928 | 10/1942 | Potter | 384/47 |
| 2,336,433 | 12/1943 | Woina | 248/430 |
| 2,398,364 | 4/1946 | Elfstrom | 29/437 X |
| 2,768,725 | 10/1956 | Foulds et al. | 29/437 |
| 3,266,135 | 8/1966 | Morin | 29/437 X |
| 4,621,784 | 11/1986 | Kaesling et al. | 248/430 |
| 4,756,503 | 7/1988 | Fujita | 384/34 X |
| 4,779,999 | 10/1988 | Lautenschlager | 384/48 X |
| 4,787,756 | 11/1988 | Pilarski | 384/47 |

FOREIGN PATENT DOCUMENTS 1215192 12/1970 United Kingdom .
1295044 11/1972 United Kingdom .

Primary Examiner—Timothy V. Eley
Assistant Examiner—Frances Chin
Attorney, Agent, or Firm—Foley & Lardner, Schwartz, Jeffery, Schwaab, Mack, Blumenthal & Evans

[57] ABSTRACT

Herein disclosed is a method of assembling a seat slide device which comprises a lower rail, an upper rail slidably disposed on the lower rail and rotating members disposed between the lower and upper rails. The method comprises by steps: (a) temporarily assembling the lower and upper rails; (b) disposing the rotating members between a space defined between the temporarily assembled lower and upper rails; (c) pressing the temporarily assembled lower and upper rails against each other with a given pressing force; (d) making a relative longitudinal movement between the temporarily assembled lower and upper rails with the pressing force kept applied thereto; and (e) removing the pressing force when the relative longitudinal movement counts a given number.

9 Claims, 5 Drawing Sheets

METHOD OF ASSEMBLING SEAT SLIDE DEVICE

BACKGROUND OF THE INVENTION

1. Field of the Invention

The present invention relates in general to a seat slide device for a motor vehicle, and more particularly, to a method of assembling the seat slide device.

2. Description of the Prior Art

In order to provide a seat occupant with a comfortable sitting posture, various types of seat slide devices have been proposed and put into practical use particularly in the field of motor vehicles.

One of the conventional seat slide devices is shown in FIG. 12 of the accompanying drawings, which generally comprises a lower rail 101 secured to a vehicle floor (not shown), an upper rail 103 slidably disposed on the lower rail 101 and secured to a bottom of a seat (not shown), and a lock mechanism (not shown) for locking the upper rail 103 at a desired fore-and-aft position relative to the lower rail 101. As is seen from FIG. 12, the lower rail 101 has a generally "U"-shaped cross section and thus has outwardly extending side flanges (no numerals), while the upper rail 103 has a generally "C"-shaped cross section and thus has inwardly extending side flanges (no numerals), and these two rails 101 and 103 are coupled with their side flanges facing each other. Guide rollers 105 are interposed between respective major parts of the lower and upper rails 101 and 103, and balls 107 are disposed between the facing flanges of the rails 101 and 103. These guide rollers 105 and the balls 107 are held by axially spaced two retainers 109 (only one is shown) which are arranged between the lower and upper rails 101 and 103, as shown. With this arrangement, the upper rail 103 on which the seat is mounted is slidable forward or rearward relative to the fixed lower rail 101. When the upper rail 103 comes to a desired position, the lock mechanism is operated to lock the upper rail 103 at the desired position.

However, the above-mentioned seat slide device tends to have the following drawbacks due to its inherent construction.

That is, it is difficult or at least troublesome to assemble the seat slide device with precision. More specifically, it has been difficult to provide the spaces for the guide roller 105 and the balls 107 with precise dimensions "A" and "B" due to unavoidable difficulty in producing the rails 101 and 103 by press or roll forming method. In fact, if the dimensions "b" and "a" of the lower and upper rails 101 and 103 lack accuracy, the dimensions "A" and "B" of the spaces for the guide roller 105 and the balls 107 lack accuracy and thus smooth sliding movement of the upper rail 103 relative to the lower rail 101 is not achieved. In a severe case wherein the dimension error exceeds allowance, it becomes impossible to mount the guide roller 105 and the balls 107 into the spaces.

SUMMARY OF THE INVENTION

It is therefore an object of the present invention to provide a method of assembling a seat sliding device, which eliminates the above-mentioned drawbacks.

According to one aspect of the present invention, there is provided an improved method of assembling a seat slide device which comprises a lower rail, an upper rail slidably disposed on the lower rail and rotating members disposed between the lower and upper rails. The method comprises by steps: (a) temporarily assembling the lower and upper rails; (b) disposing the rotating members between a space defined between the temporarily assembled lower and upper rails; (c) pressing the temporarily assembled lower and upper rails against each other with a given pressing force; (d) making a relative longitudinal movement between the temporarily assembled lower and upper rails with the pressing force kept applied thereto; and (e) removing the pressing force when the relative longitudinal movement counts a given number.

According to another aspect of the present invention, there is provided a reshaping device for reshaping temporarily assembled lower and upper rails of a seat slide device. The reshaping device comprises a fixed elongate base member, an elongate pressing die having a longitudinally extending groove whose contour corresponds to the external shape of one of the rails, and movers arranged at longitudinally opposed sides of the base member for reciprocatively moving the other of the rails relative to the one.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
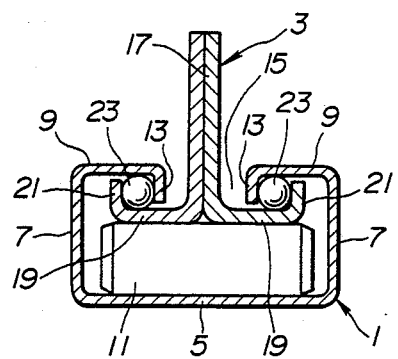
FIG. 1 is a sectional view of a seat slide device which is assembled by a method according to the present invention.

In the following, the present invention will be described in detail with reference to FIGS. 1 to 12, which is a method of assembling a seat slide device.

In the drawings, denoted by numeral 1 is a lower rail which is secured to a vehicle floor (not shown), and denoted by numeral 3 is an upper rail which is secured to a bottom of a seat (not shown).

Figure 10:
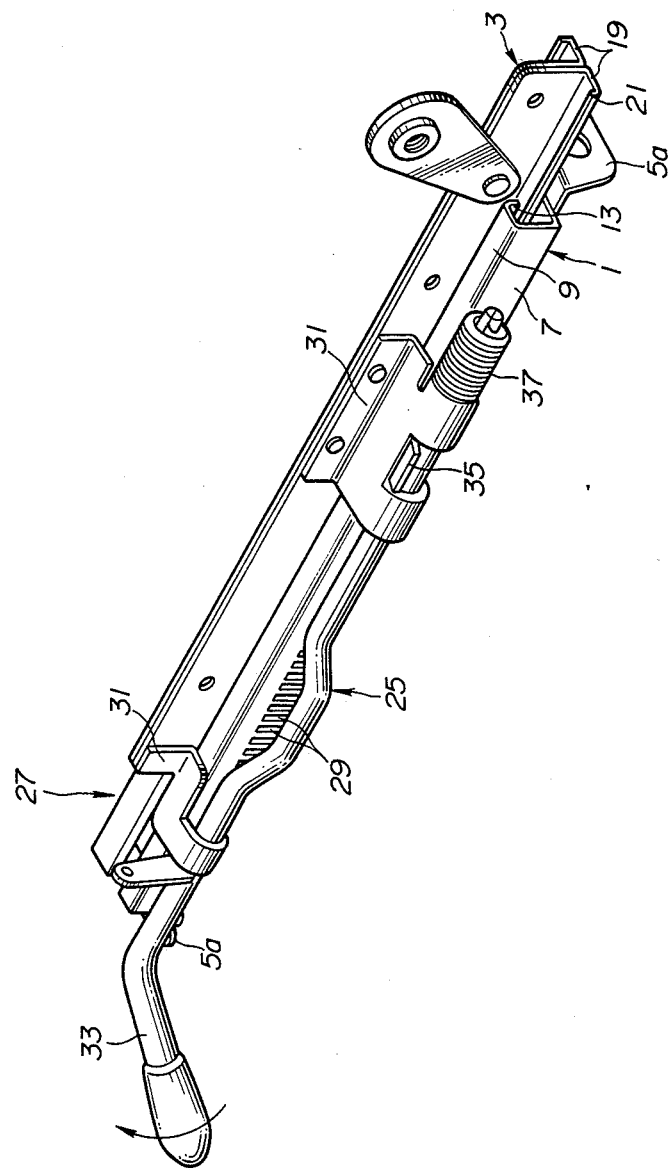
FIG. 10 is a perspective view of the seat slide device produced by the method of the present invention.
Figure 11:
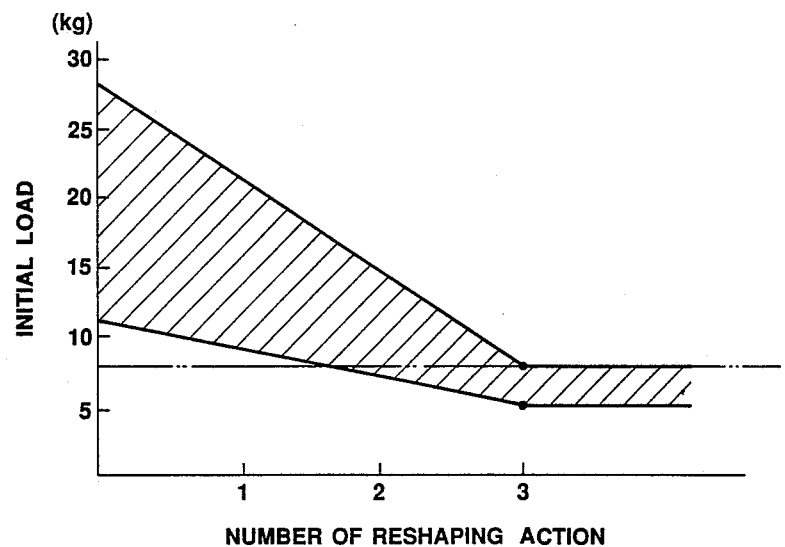
FIG. 11 is a graph showing the number of reshaping action with respect to an initial load applied to the temporarily assembled lower and upper rails.

As is seen from FIG. 10, two brackets 5a are secured to longitudinally opposed ends of the lower rail 1 for securedly mounting the rail 1 to the vehicle floor.

As is seen from FIG. 1, the lower rail 1 comprises a flat bottom wall 5, side walls 7 and 7 extending upward from side ends of the flat bottom wall 5, upper walls 9 and 9 extending toward each other from upper ends of the side walls 7 and 7, and flanges 13 and 13 extending downward from inward ends of the upper walls 9 and 9 with a longitudinally extending slot 15 left therebetween. Thus, the lower rail 1 has a generally C-shaped cross section, as shown. Within the lower rail 1, there are disposed guide rollers 11 each having an axis perpendicular to the axis of the lower rail 1.

The upper rail 3 comprises a vertical major wall 17 having an upper end secured to the bottom of the seat, flat lower walls 19 and 19 extending horizontally in opposed directions from a lower end of the vertical major wall 17, and flanges 21 and 21 extending upward from outward ends of the flat lower walls 19 and 19. Thus, the upper rail 3 has a generally T-shaped cross section. In the illustrated example, two identical pieces, each having a generally L-shaped cross section, are connected in back-to-back fashion to constitute the upper rail 3. The upper rail 3 is slidably interconnected with the lower rail 1 having the flat lower walls 19 and 19 thereof spacedly interlocked with the upper walls 9 and 9 of the lower rail 1. The flat lower walls 19 and 19 of the upper rail 3 ride on the guide rollers 11. Balls 3 and 23 are disposed between the mutually interlocked lower and upper walls 19 and 9 of the upper and lower rails 3 and 1. As will be understood from FIG. 1, due to provision of the flanges 21 and 13, lateral dislocation of the balls 23 is restricted. Thus, the flanges 21 and 13 serve as ball stoppers.

Figure 7:
FIG. 7 is a sectional view of a retainer employed in the seat slide device.
Figure 12:
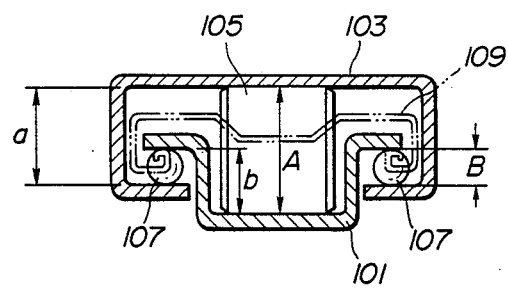
FIG. 12 is a sectional view of a conventional seat slide device.

Similar to the case of the afore-mentioned conventional seat slide device of FIG. 12, the guide rollers 11 and the balls 23 are held by two, that is, front and rear retainers 39 (see FIG. 7).

As is shown in FIG. 10, the seat slide device is equipped with a lock mechanism 25 which functions to lock the upper rail 3 at a desired position relative to the lower rail 1.

The lock mechanism 25 comprises generally a plurality of notches 29 formed in one side wall 7 of the lower rail 1, an operation lever 33 rotatably connected through brackets 31 and 31 to the vertical major wall 17 of the upper rail 3, a pawl 35 fixed to the operation lever 33 and latchingly engageable with the notches 29, and a spring 37 biasing the operation lever 33 in a direction to achieve a latching engagement of the pawl 35 with the notches 29. Thus, usually, due to the force of the spring 37, the pawl 35 is kept engaged with one of the notches 29 to lock the upper rail 3 relative to the lower rail 1. When the operation lever 33 is manipulated to disengage the pawl 35 from the notch 29, the locked condition is cancelled. Thus, when pushed forward or rearward with the operation lever 33 kept manipulated, the upper rail 3 can be moved to a desired position relative to the lower rail 1. Upon releasement of the operation lever 33, the pawl 35 is turned and brought into latching engagement with one of the notches 29 to achieve locked condition of the seat slide device.

In accordance with the present invention, the following method is employed for assembling the seat slide device.

First, as is seen from FIG. 1, the lower rail 1 is laid on a flat place (not shown) with the axially extending slot 15 facing upward. Then, the flat lower walls 19 and 19 of the upper rail 3 are put into the lower rail 1 to achieve a loose interconnection between the lower and upper rails 1 and 3. Then, the guide rollers 11 are disposed in the lower rail 1 in a manner to support thereon the flat lower walls 19 and 19 of the upper rail 3, and the balls 23 and 23 are disposed between the mutually interlocked lower and upper walls 19 and 9 of the upper and lower rails 3 and 1, together with the retainers 39. The steps for assembling the guide rollers 11 and the balls 23 may be reversed.

Figure 2:
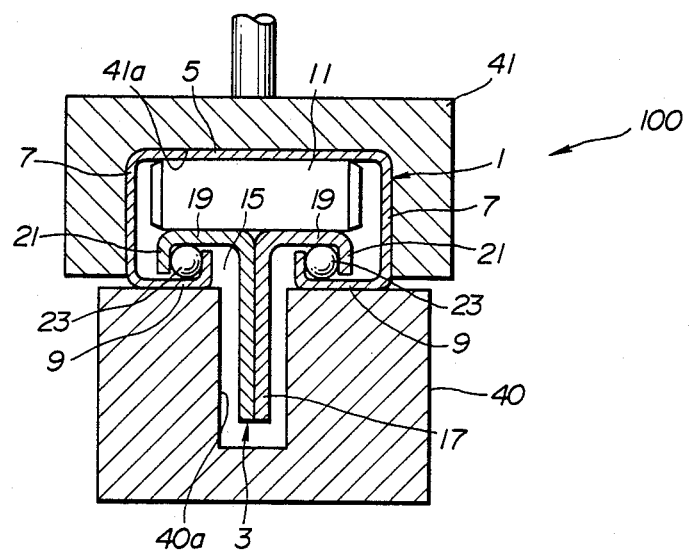
FIG. 2 is a sectional view of a reshaping machine in a condition wherein the temporarily assembled upper and lower rails are being reshaped by the reshaping machine.
Figure 9:
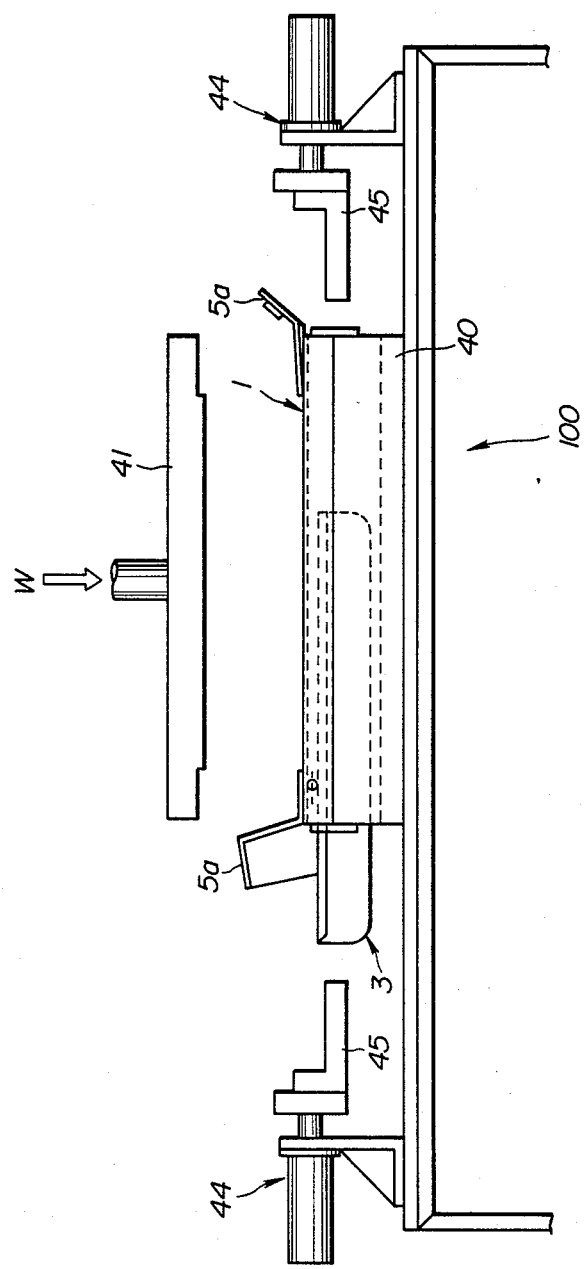
FIG. 9 is a side view of the reshaping machine with the temporarily assembled upper and lower rails being set therein.

Then, as is seen from FIG. 2, the temporarily assembled lower and upper rails 1 and 3 are turned upside down and then, as is seen from FIG. 9, the same o are set on a reshaping machine 100.

The reshaping machine 100 may be named "Break-In" machine for the reasons which will become apparent as the description proceeds.

As is seen from these drawings, the reshaping machine 100 comprises a fixed elongate base member 40 having a longitudinally extending slot 40a formed therein, a pressing die 41 having a longitudinally extending groove 41a and two movers 44 and 44 for reciprocatively moving the temporarily assembled lower asnd upper rails 1 and 2 on the reshaping machine 100. The slot 40a of the base member 40 has a width greater than the thickness of the vertical major wall 17 of the upper rail 3, while, the groove 41a of the pressing die 41 is precisely formed to have a contour which corresponds to a desired external shape of the inner rail 1. Although not shown in FIG. 9, a hydraulically operated actuator is used for carrying down the pressing die 41 to its operative position just above the base member 40, as is seen from FIG. 2. It is to be noted that, under this operative condition of the die 41, the distance between the bottom of the groove 41a of the die 41 and the upper face of the base member 40 has a precise dimension, that is, the distance corresponds precisely to a desired thickness of the lower rail 1 in an assembled condition. The movers 44 and 44 are arranged at longitudinally opposed sides of the base member 40 and powered by compressed air or the like. Each mover 44 has a work rod 45 which is engagable with a longitudinal end of the vertical major wall 17 of the upper rail 3.

The setting of the temporarily assembled lower and upper rails 1 and 3 on the reshaping machine 100 is made as follows.

That is, the temporarily assembled rails 1 and 3 are put on the base member 40 having the vertical major wall 17 projected into the slot 40a of the base member 40. Then, the pressing die 41 is moved down to the operative position neatly receiving the reversedly oriented lower rail 1 in the groove 41a thereof in such a manner as is understood from FIG. 2. Although not shown in the drawings,, upon this, suitable stoppers formed on the pressing die 41 are engaged with given portions of the lower rail 1 to suppress longitudinal movement of the lower rail 1 relative to the pressing die 41.

Then, the movers 44 and 44 are alternately operated. With this operation, the reversely oriented upper rail 3 is forced to move reciprocatively by the work rods 45 of the movers relative to the lower rail 1. Experiment has revealed that when an initial load applied to the temporarily assembled lower and upper rails 1 and 3 by the pressing die 41 is about 27 Kg, desirable result is obtained from three times of the sliding movement of the upper rail 3. This will be understood from the graph of FIG. 11.

Figure 8:
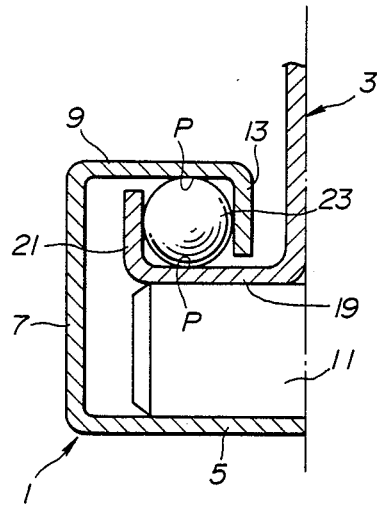
FIG. 8 is an enlarged left half sectional view of the seat slide device, showing a condition wherein the assembled upper and lower rails have been reshaped by the reshaping machine.

As is seen from FIG. 8, as a result of the sliding movement of the upper rail 3, there are formed, by the balls 23, shallow guide grooves or traces P and P on the flat walls 9 and 19 of the lower and upper rails 1 and 3. Furthermore, due to the sliding movement, the bottom wall 5 of the lower rail 1 and the flat walls 19 of the upper rail 3 are smoothed by the guide rollers 11.

When the pressing die 41 is lifted, the load applied to the lower rail 1 is removed and thus the lower rail 1 and the upper rail 3 assume their normally assembled condition. That is, due to the reshaping step employed in the assembling steps for the seat slide device, smooth movement of the upper rail 3 relative to the lower rail 1 is assured.

Figure 3:
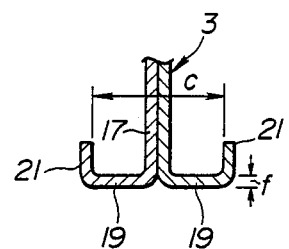
FIG. 3 is a sectional view of the upper rail.
Figure 4:
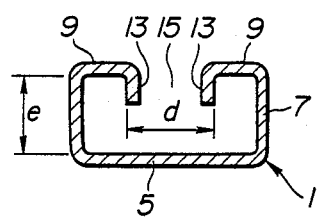
FIG. 4 is a sectional view of the lower rail.
Figure 5:
FIG. 5 is a front view of a ball employed in the seat slide device.
Figure 6:
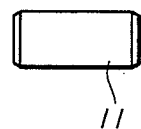
FIG. 6 is a front view of a guide roller employed in the seat slide device.

Thus, even if the upper rail 3 and the lower rail 1 have been produced with some dimensional errors in the length denoted by references "c", "d", "e" and "f" in FIGS. 3 and 4, the reshaping step will remove the possible problem of the finally assembled seat slide device.

Thereafter, the lock mechanism 25 is mounted to the assembled lower and upper rails 1 and 3.

Although the above description is directed to an example wherein the reshaping is carried out with the temporarily assembled lower and upper rails 1 and 3 kept turned upside down, such reshaping may be carried out with the seat slide device standing normally. Furthermore, the reshaping step according to the present invention may be also applied to the seat slide devices of the type shown in FIG. 12.

What is claimed is:

1. A method of assembling a set slide device which comprises a lower rail, an upper rail slidably disposed on said lower rail and rotating members disposed between said lower and upper rails, said method comprising by steps:
    (a) temporarily assembling the lower and upper rails;
    (b) disposing the rotating members between a space defined between the temporarily assembled lower and upper rails;
    (c) pressing the temporarily assembled lower and upper rails against each other with a given pressing force;
    (d) making a relative longitudinal movement between the temporarily assembled lower and upper rails whereby said pressing force is maintained;
    (e) removing said pressing force after an amount of relative longitudinal movement sufficient for reshaping at least one member of said seat sliding device.

2. A method as claimed in claim 1, in which between the step (b) and the step (c), there is further employed a step (f) of turning the temporarily assembled lower and upper rails upside down.

3. A method as claimed in claim 2, wherein the step (d) comprises producing traces of said rotating members on ways of the lower and upper rails along which the rotating members run.

4. A method as claimed in claim 3, wherein said lower rail comprises a generally C-shaped cross section and said upper rail comprises a generally T-shaped cross section, and wherein the lower and upper rails are temporarily assembled and said lower rail receives a flat head portion of the upper rail to achieve a slidable interlock therebetween.

5. A method as claimed in claim 4, wherein said rotating members comprise two types of rolling members, one being a roller type and the other being a ball type.

6. A method as claimed in claim 5, wherein said lower rail comprises inwardly extending portions with respective first flanges, said flat head portion of said upper rail comprises opposed end portions with respective second flanges, said first and second flanges constituting a holder for each ball type rolling member when the two rails are temporarily assembled.

7. A method as claimed in claim 6, wherein said roller type rolling members are disposed between a bottom wall of said lower rail and the flat head portion of said upper rail.

8. A method as claimed in claim 1, further comprising a step (g) after the step (e) mounting a lock mechanism to the assembled rails.

9. A method as claimed in claim 1, wherein said upper rail comprises two longitudinally opposed ends and the step (d) comprises pushing alternately the longitudinally opposed ends of said upper rail to achieve a reciprocating movement of said upper rail relative to said lower rail.

* * * * *